(12) United States Patent
Ko

(10) Patent No.: US 12,315,932 B2
(45) Date of Patent: May 27, 2025

(54) ANODE INCLUDING BINDER FORMED FROM (METH) ACRYLAMIDE, UNSATURATED ORGANIC ACID, UNSATURATED NITRILE, AND DIACRYLAMINDE /DIACRYLATE, AND LITHIUM SECONDARY BATTERY COMPRISING SAME

(71) Applicant: LG ENERGY SOLUTION, LTD., Seoul (KR)

(72) Inventor: Minjin Ko, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/077,521

(22) Filed: Dec. 8, 2022

(65) Prior Publication Data
US 2023/0197961 A1    Jun. 22, 2023

(30) Foreign Application Priority Data
Dec. 15, 2021    (KR) .................... 10-2021-0180143

(51) Int. Cl.
*H01M 4/62*    (2006.01)
*H01M 4/02*    (2006.01)
*H01M 4/48*    (2010.01)
*H01M 10/0525*    (2010.01)

(52) U.S. Cl.
CPC ...... *H01M 4/622* (2013.01); *H01M 2004/021* (2013.01); *H01M 2004/027* (2013.01); *H01M 4/483* (2013.01); *H01M 10/0525* (2013.01)

(58) Field of Classification Search
CPC .............................. H01M 4/622; H01M 4/483
USPC ................... 429/217, 218.1, 231.8
See application file for complete search history.

(56) References Cited

U.S. PATENT DOCUMENTS

| | | |
|---|---|---|
| 9,887,423 B2 | 2/2018 | Kang et al. |
| 10,986,374 B2 | 4/2021 | Matsuo et al. |
| 2015/0263350 A1 | 8/2015 | Kang et al. |
| 2016/0064731 A1 | 3/2016 | Jung et al. |
| 2016/0126551 A1* | 5/2016 | Sasaki ............... H01M 10/0525 525/200 |
| 2018/0102542 A1 | 4/2018 | Matsuzaki et al. |
| 2019/0006677 A1 | 1/2019 | Matsuo et al. |
| 2019/0305279 A1* | 10/2019 | Takamatsu ............ H01M 50/46 |
| 2020/0335827 A1* | 10/2020 | Sugimoto ............... C09J 125/14 |
| 2020/0347172 A1* | 11/2020 | Yamamoto ............ H01M 4/622 |
| 2020/0381735 A1 | 12/2020 | Oh et al. |

(Continued)

FOREIGN PATENT DOCUMENTS

| | | | | |
|---|---|---|---|---|
| CN | 105247718 A | 1/2016 | | |
| CN | 108963187 A | * 12/2018 | ............. | B82Y 30/00 |

(Continued)

OTHER PUBLICATIONS

International Search Report (including an English translation thereof) issued in the corresponding International Application No. PCT/KR2022/019530 on Mar. 21, 2023.

(Continued)

*Primary Examiner* — Sean P Cullen
(74) *Attorney, Agent, or Firm* — Birch, Stewart, Kolasch & Birch, LLP

(57) ABSTRACT

An anode composition, a lithium secondary battery anode including the same, and a lithium secondary battery including the anode.

15 Claims, 1 Drawing Sheet

(56) References Cited

U.S. PATENT DOCUMENTS

| | | | |
|---|---|---|---|
| 2021/0057748 A1 | 2/2021 | Ozaki et al. | |
| 2022/0216479 A1 | 7/2022 | Jun et al. | |
| 2022/0336868 A1* | 10/2022 | Asai | H01M 50/417 |
| 2023/0080302 A1 | 3/2023 | Kang et al. | |

FOREIGN PATENT DOCUMENTS

| | | | | |
|---|---|---|---|---|
| CN | 110982008 A * | 4/2020 | | C08F 2/26 |
| CN | 111057184 A * | 4/2020 | | C08F 2/24 |
| CN | 113555558 A * | 10/2021 | | |
| JP | 2009-80971 A | 4/2009 | | |
| JP | 2017-174804 A | 9/2017 | | |
| JP | 2019057488 A * | 4/2019 | | H01M 10/0525 |
| KR | 10-2014-0070341 A | 6/2014 | | |
| KR | 10-2016-0028634 A | 3/2016 | | |
| KR | 10-2020-0139018 A | 12/2020 | | |
| KR | 10-2021-0023749 A | 3/2021 | | |
| KR | 10-2021-0034966 A | 3/2021 | | |
| KR | 10-2021-0097646 A | 8/2021 | | |
| WO | WO 2016/171028 A1 | 10/2016 | | |
| WO | WO 2017/163806 A1 | 9/2017 | | |
| WO | WO 2018/006555 A1 | 1/2018 | | |
| WO | WO-2018008555 A1 * | 1/2018 | | A61F 5/04 |
| WO | WO 2019/013102 A1 | 1/2019 | | |
| WO | WO-2021059880 A1 * | 4/2021 | | C08F 220/56 |

OTHER PUBLICATIONS

Korean Office Action (including an English translation thereof) issued in the corresponding Korean Patent Application No. 10-2022-0167020 on Aug. 29, 2023.

Written Opinion of the International Searching Authority (including an English translation thereof) issued in the corresponding International Application No. PCT/KR2022/019530 on Mar. 21, 2023.

* cited by examiner

ANODE INCLUDING BINDER FORMED FROM (METH) ACRYLAMIDE, UNSATURATED ORGANIC ACID, UNSATURATED NITRILE, AND DIACRYLAMINDE /DIACRYLATE, AND LITHIUM SECONDARY BATTERY COMPRISING SAME

RELATED APPLICATION DATA

The present application claims priority under 35 U.S.C. 119(a) to KR 10-2021-0180143, filed on Dec. 15, 2021 in the Republic of Korea, the content of which is hereby expressly incorporated by reference in its entirety.

TECHNICAL FIELD

The present application relates to an anode composition, a lithium secondary battery anode comprising the same, and a lithium secondary battery comprising the anode.

BACKGROUND ART

Due to the rapid increase in the use of fossil fuels, the demand for the use of alternative energy or clean energy is increasing, and as a part of this, the field that is being studied most actively is the field of power generation and power storage using electrochemical reaction.

Currently, a secondary battery may be a representative example of an electrochemical device using such electrochemical energy, and its use is gradually expanding.

As mobile device technology development and demand increase, the demand for secondary batteries as an energy source is rapidly increasing. Among these secondary batteries, a lithium secondary battery having high energy density and voltage, a long cycle life, and a low self-discharge rate has been commercialized and widely used. Further, research is being actively conducted on a method for manufacturing a high-density electrode having a higher energy density per unit volume as an electrode for such a high-capacity lithium secondary battery.

In general, a secondary battery is composed of a cathode, an anode, an electrolyte, and a separator. The anode comprises an anode active material for intercalating and deintercalating lithium ions coming out from the cathode, and silicon-containing particles having a large discharge capacity may be used as the anode active material.

In particular, according to the recent demand for high-density energy batteries, research on a method of increasing the capacity by using as an anode active material a silicon-containing compound together such as Si/C or $SiO_x$, which has a capacity 10 times or more larger than that of a graphite-containing material, is being actively conducted. However, in the case of a silicon-containing compound, which is a high-capacity material, compared to graphite that has conventionally been used, there is a problem in that the capacity is large, but the volume rapidly expands during the charging process so that the conductive path is cut off to deteriorate the battery properties.

Therefore, in order to solve a problem when using the silicon-containing compound as an anode active material, methods of suppressing the volume expansion itself such as a method of controlling the driving potential, a method of additionally further coating a thin film on the active material layer and a method of controlling the particle diameter of the silicon-containing compound, or various methods for preventing the conduction path from being cut off are being discussed. However, in the case of the above methods, since the performance of the battery may be rather deteriorated, there is a limit to the application, and there is still a limit to the commercialization of manufacturing an anode battery having a high content of the silicon-containing compound.

In particular, research on the composition of the binder according to volume expansion has also been conducted, and research is underway to use binder polymers with strong stress on the side in order to suppress volume expansion caused by charging and discharging of an anode active material having a large volume change. However, these binder polymers alone have had a limit in suppressing the thickness increase of the electrode due to the contraction and expansion of the anode active material and the performance deterioration of the lithium secondary battery derived therefrom.

Further, in order to solve the above problems, research on introducing a crosslinking agent into the binder polymers was also conducted. However, since such a method may have problems in viscosity change and phase stability of the slurry due to long-term storage of batteries, there is a difficulty in applying it to the actual process.

Therefore, even when an anode active material having a large volume expansion is used, a change in the thickness of the anode can be minimized, and accordingly, research on an anode binder capable of improving the capacity retention rate is required.

PRIOR ART DOCUMENTS

Patent Documents (Patent Document 1) Japanese Patent Laid-Open Publication No. 2009-080971

SUMMARY OF THE INVENTION

Regarding the binder applied to, for instance, a silicon-containing anode, as a result of research on a binder with improved slurry dispersibility and excellent adhesion, it was found that the above-mentioned problems can be solved when the anode binder polymer has a specific composition that may have a partially crosslinked structure.

Accordingly, the present application relates to an anode composition, a lithium secondary battery anode comprising the same, and a lithium secondary battery comprising the anode.

An embodiment of the present specification provides an anode composition comprising an anode binder polymer, an anode active material, and an anode conductive material, wherein the anode binder polymer comprises: a (meth) acrylamide group-containing compound; an unsaturated organic acid or a salt of the unsaturated organic acid; monomer units including α,β-unsaturated nitriles; and a diacrylamide- or diacrylate-containing compound, and the anode composition comprises 1 part by weight or more and 30 parts by weight or less of monomers units including α,β-unsaturated nitriles; and 0.1 parts by weight or more and 15 parts by weight or less of the diacrylamide- or diacrylate-containing compound based on 100 parts by weight of the anode binder polymer.

In another embodiment, there is provided a lithium secondary battery anode comprising: an anode current collector layer; and an anode active material layer containing an anode composition according to the present application on one or both surfaces of the anode current collector layer.

Finally, there is provided a lithium secondary battery comprising: a cathode; a lithium secondary battery anode according to the present application; a separator provided between the cathode and the anode; and an electrolyte.

Advantageous Effects

The anode composition according to an embodiment of the present disclosure is characterized in that it comprises an anode binder polymer comprising: a (meth) acrylamide group-containing compound; an unsaturated organic acid or a salt of the unsaturated organic acid; monomer units including α,β-unsaturated nitriles; and a diacrylamide- or diacrylate-containing compound.

In particular, the anode composition may include: 1 part by weight or more and 30 parts by weight or less of monomer units including α,β-unsaturated nitriles; and 0.1 parts by weight or more and 15 parts by weight or less of the diacrylamide- or diacrylate-containing compound based on 100 parts by weight of the anode binder polymer. Accordingly, even when an anode active material (especially, a silicon-containing active material) having a large volume expansion due to charging/discharging is used, it is characterized in that volume expansion and contraction can be suppressed, thickness change due to electrode swelling can be minimized, and the lifespan performance of the lithium secondary battery is excellent accordingly.

The anode binder polymer according to the present application may form a partially crosslinked structure by comprising a specific amount of diacrylamide- or diacrylate-containing compound in order to partially crosslink the binder polymer.

When the anode binder polymer to which the characteristics as described above are applied is present, there are characteristics in that the thickness change of the electrode during charging and discharging is small due to the partially crosslinked structure of the binder itself, and the capacity retention rate is improved when performing the lifespan evaluation. The content of diacrylamide or diacrylate-containing compounds may represent the degree of partial cross-association of polymers.

That is, it is a feature of the present disclosure that the anode composition according to an embodiment of the present disclosure has improved capacity characteristics by comprising a silicon-containing active material having a high theoretical capacity as an anode active material, and volume expansion due to charging and discharging, which is a problem of the silicone-containing active material, has been solved using a specific anode binder polymer according to the present application.

DETAILED DESCRIPTION

Figure 1:
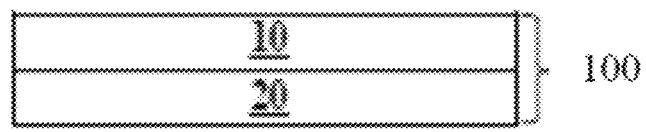
FIG. 1 is a diagram illustrating a laminated structure of a lithium secondary battery anode according to an embodiment of the present application.

Before describing the present disclosure, some terms are first defined.

In the present specification, if a prescribed part "includes" a prescribed element, this means that another element can be further included instead of excluding other elements unless any particularly opposite description exists.

In the present specification, 'p to q' means a range of 'p or more and q or less'.

In the present specification, "a specific surface area" is one measured by the BET method, and is specifically calculated from the nitrogen gas adsorption amount under liquid nitrogen temperature (77 K) using BEL Japan's BELSORP-mino II. That is, the BET specific surface area in the present application may mean a specific surface area measured by the above measurement method.

In the present specification, "Dn" refers to a particle size distribution, and refers to a particle diameter at an n° point of the cumulative distribution of the number of particles according to the particle diameter. That is, D50 is the particle diameter (average particle diameter) at a 50% point of the cumulative distribution of the number of particles according to the particle diameter, D90 is the particle diameter at a 90% point of the cumulative distribution of the number of particles according to the particle diameter, and D10 is the particle diameter at a 10% point of the cumulative distribution of the number of particles according to the particle diameter. Meanwhile, the particle size distribution may be measured using a laser diffraction method. Specifically, after dispersing a measurement target powder in a dispersion medium, it is introduced into a commercially available laser diffraction particle size measuring device (e.g., Microtrac S3500) to calculate the particle size distribution by measuring the diffraction pattern difference according to the particle size when the particles pass through the laser beam.

In the present specification, the meaning that a polymer comprises a certain monomer or compound as a monomer or compound unit means that the monomer or compound participates in a polymerization reaction and is contained as a repeating unit in the polymer. In the present specification, when it is said that the polymer comprises a monomer or compound, this is interpreted the same as that the polymer comprises the monomer or compound as a monomer unit.

In the present specification, the term 'polymer' is understood to be used in a broad sense comprising a copolymer unless specified as a 'homopolymer'.

In the present specification, the weight average molecular weight (Mw) and the number average molecular weight (Mn) are a polystyrene conversion molecular weight obtained by allowing a monodisperse polystyrene polymer (standard sample) of various polymerization degrees commercially available for molecular weight measurement as a standard material to be measured by gel permeation chromatography (GPC). In the present specification, the molecular weight means a weight average molecular weight unless otherwise specified.

Hereinafter, the present disclosure will be described in detail with reference to the drawings so that those of ordinary skill in the art to which the present disclosure pertains can easily practice the present disclosure. However, the present disclosure may be embodied in various different forms and is not limited to the description below.

Anode Composition

An embodiment of the present specification provides an anode composition comprising an anode binder polymer, an anode active material, and an anode conductive material, wherein the anode binder polymer comprises: a (meth) acrylamide group-containing compound; an unsaturated organic acid or a salt of the unsaturated organic acid; monomer units including α,β-unsaturated nitriles; and a diacrylamide- or diacrylate-containing compound, and the anode composition comprises 1 part by weight or more and 30 parts by weight or less of the monomer units including α,β-unsaturated nitriles and; and 0.1 parts by weight or more and 15 parts by weight or less of the diacrylamide- or diacrylate-containing compound based on 100 parts by weight of the anode binder polymer.

Anode Binder Polymer

The anode binder polymer according to the present application may form a partially crosslinked structure by comprising a specific amount of a diacrylamide- or diacrylate-containing compound in order to partially crosslink the binder polymer. That is, when the anode binder polymer to which the characteristics as described above are applied is included, there are characteristics in that the thickness change of the anode during charging and discharging is small due to the partially crosslinked structure of the binder polymer itself, and the capacity retention rate is improved when performing the lifespan evaluation.

In an embodiment of the present application, the anode binder polymer may comprise a (meth) acrylamide group-containing compound; an unsaturated organic acid or a salt of the unsaturated organic acid; monomer units including α,β-unsaturated nitriles; and a diacrylamide- or diacrylate-containing compound In an embodiment of the present application, the (meth) acrylamide group-containing compound may be contained in an amount of 30 parts by weight or more and 80 parts by weight or less based on 100 parts by weight of the anode binder polymer.

In another embodiment, the (meth)acrylamide group-containing compound may be contained in an amount of 30 parts by weight or more and 80 parts by weight or less, preferably 35 parts by weight or more and 75 parts by weight or less, and more preferably 40 parts by weight or more and 70 parts by weight or less based on 100 parts by weight of the anode binder polymer.

In an embodiment of the present application, the unsaturated organic acid or the salt of the unsaturated organic acid may be present in an amount of 5 parts by weight or more and 40 parts by weight or less, preferably 10 parts by weight or more and 35 parts by weight or less, and more preferably 15 parts by weight or more and 35 parts by weight or less based on 100 parts by weight of the anode binder polymer.

In an embodiment of the present application, there is provided an anode composition comprising: 1 part by weight or more and 30 parts by weight or less of monomer units including α,β-unsaturated nitriles; and 0.1 parts by weight or more and 15 parts by weight or less of the diacrylamide- or diacrylate-containing compound based on 100 parts by weight of the anode binder polymer.

In another embodiment, the monomer units including α,β-unsaturated nitriles may be present in an amount of 1 part by weight or more and 30 parts by weight or less, preferably 3 parts by weight or more and 30 parts by weight or less, and more preferably 5 parts by weight or more and 30 parts by weight or less based on 100 parts by weight of the anode binder polymer.

In another embodiment, the diacrylamide- or diacrylate-containing compound may be contained in an amount of 0.1 parts by weight or more and 15 parts by weight or less, preferably 0.5 parts by weight or more and 12 parts by weight or less based on 100 parts by weight of the anode binder polymer.

The anode binder polymer according to the present application comprises four types of monomer units as described above, and in particular, the anode binder polymer is characterized in that it is contained in the amount as described above. As it has the above content, the anode binder polymer forms a partially crosslinked structure and the binding power is improved so that the thickness change of the electrode is small during charging and discharging of the electrode containing it, and accordingly, the capacity retention rate is improved when performing the lifespan evaluation.

In an embodiment of the present application, comprising a specific part by weight of the composition based on 100 parts by weight of the anode binder polymer may mean the weight ratio of each component monomer with respect to the total weight of 100 of the monomer group of the anode binder polymer, and it is expressed in parts by weight.

In an embodiment of the present application, there is provided an anode composition having a molar ratio of the (meth)acrylamide group-containing compound to the unsaturated organic acid or the salt of the unsaturated organic acid of 1:0.1 to 1:0.6.

The molar ratio may mean a ratio of moles included based on 100 parts by weight of the anode binder polymer according to the present application, and may specifically mean a ratio of mole %.

In an embodiment of the present application, the anode binder polymer may comprise a (meth)acrylamide group-containing compound.

In an embodiment of the present application, the (meth) acrylamide may include: methacrylamide; or acrylamide.

In an embodiment of the present application, the unsaturated organic acid may be used without limitation as long as it is an organic acid that may be contained in the binder, but specifically acrylic acid may be used. At this time, the salt of the unsaturated organic acid may mean a salt form containing ions in the unsaturated organic acid, and this may also be used without limitation. Specific, but non-limiting examples of unsaturated organic acids include, for example, carboxy acid or salt thereof. The carboxylic acid may be used a carboxylic acid monomer or salt, such as (meth) acrylic acid, itaconic acid, fumaric acid, crotonic acid, maleic acid, monomethyl itaconate, methyl fumarate, monobutyl fumarate, and may be used in a mixture of two or more of these.

In an embodiment of the present application, the monomer units including α,β-unsaturated nitriles may be acrylonitrile.

In an embodiment of the present application, there is provided an anode composition in which the diacrylamide- or diacrylate-containing compound is: alkyl diacrylamide; alkylene oxide diacrylamide; or alkylene oxide diacrylate.

Specifically, the diacrylamide- or diacrylate-containing compound may comprise: N,N'-methylenebisacrylamide; or ethylene glycol diacrylate.

The anode binder polymer according to the present application comprises four components having specific contents and compositions as described above, and even when an anode active material (especially, a silicon-containing active material) having a large volume expansion according to charging/discharging is used, it may be possible to suppress volume expansion and contraction, and to minimize thickness change due to electrode swelling, and accordingly, the lifespan performance of the lithium secondary battery may be enhanced.

The four components may be polymerized to form an anode binder polymer.

In an embodiment of the present application, there is provided an anode composition in which the anode binder polymer may have a weight average molecular weight of 100,000 g/mol or more and 3,000,000 g/mol or less.

In another embodiment, the anode binder polymer may have a weight average molecular weight range of 100,000 g/mol or more and 3,000,000 g/mol or less, preferably 200,000 g/mol or more and 1,500,000 g/mol or less.

When the anode binder polymer as described above satisfies the above weight average molecular weight range of 100,000 g/mol or more and 3,000,000 g/mol or less, the mechanical strength is excellent, and the intermolecular interaction is high so that the electrode may have excellent binding power. Further, when the above range is satisfied, the viscosity of an anode binder may be selected in an appropriate range so that when the anode is manufactured using the anode binder, the electrode may have excellent coating properties.

In an embodiment of the present application, there is provided an anode composition comprising 1 part by weight or more and 20 parts by weight or less of the anode binder polymer based on 100 parts by weight of the anode composition.

In another embodiment, the anode binder polymer may be present in an amount range of 1 part by weight or more and 20 parts by weight or less, preferably 3 parts by weight or more and 15 parts by weight or less, and more preferably 4 parts by weight or more and 15 parts by weight or less based on 100 parts by weight of the anode composition.

When the anode binder polymer is present in the above range of 1 part by weight or more and 20 parts by weight or less, the anode active material may be effectively dispersed, and it may have a characteristic of having high binding power between the electrode adhesion and the active material inside the electrode with respect to the contraction and expansion of the anode active material due to charging and discharging of the lithium secondary battery.

In an embodiment of the present application, the anode binder polymer may have a Young's modulus of $10^3$ MPa or more. In another embodiment of the present application, the anode binder polymer may have a Young's modulus of $1 \times 10^3$ MPa or more, preferably $2 \times 10^3$ MPa or more and more preferably $5 \times 10^3$ MPa or more. In another embodiment, the anode binder polymer may have a Young's modulus of $25 \times 10^3$ MPa or less, preferably $22 \times 10^3$ MPa or less, and more preferably $20 \times 10^3$ MPa or less.

In the method of measuring the Young's modulus, the anode binder polymer is put into a coated bowl and dried at room temperature for a long time to remove moisture. The dried film is obtained by vacuum drying at 130° C. for 10 hr in accordance with the electrode drying temperature. After that, the dried film can be cut or punched into a sample form of 6 mm×100 mm to collect a sample, and the tensile strength (Young's modulus) can be measured using UTM equipment.

The Young's modulus of the main binder varies depending on the measurement method, the speed, and the measurement state of the binder, but the Young's modulus of the main binder is a value measured in a dry room with a dew point of −5° C. to 22° C.

In the present application, the dew point starts to condense at a certain temperature when the humid air is cooled, and the partial pressure of water vapor in the air is equal to the saturated vapor pressure of water at the temperature. That is, when the temperature of the gas including water vapor is dropped as it is, the relative humidity may be 100% and thus may mean a temperature at which dew starts to form.

The dew point is −5° C. to 10° C., and a temperature of about 20° C. to 22° C. may be generally defined as a dry room, and in this case, the humidity corresponds to a very low level.

The anode binder polymer may have dispersibility for dispersing the anode active material in the anode slurry state containing the anode composition and adhesiveness for binding to the anode current collector layer and the anode active material layer after drying. In addition, the adhesive strength corresponds to a binder that is not necessarily high. That is, the anode binder polymer according to the present application satisfies the Young's modulus, and may mean a binder having a planar bonding form.

The anode binder polymer may have a property that is hydrophilic and insoluble in an electrolyte or an electrolyte solution generally used in a secondary battery. When applied to an anode or a lithium secondary battery, this property may impart strong stress or tensile strength to the anode binder polymer, and thus, the problem of volume expansion/contraction caused by charge/discharge of the silicon-based active material may be effectively suppressed.

In an embodiment of the present application, the anode binder polymer may further comprise at least any one selected from the group consisting of polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene butadiene rubber (SBR), fluororubber, polyacrylic acid, and materials in which hydrogen is substituted with Li, Na, or K, and may further comprise various copolymers thereof.

The anode binder polymer according to an embodiment of the present application serves to hold the anode active material and the anode conductive material in order to prevent distortion and structural deformation of the anode structure in volume expansion and relaxation of the silicon-containing active material.

In an embodiment of the present application, there is provided an anode composition in which the anode active material comprises one or more selected from the group consisting of a silicon-containing active material and a carbon-containing active material.

In an embodiment of the present application, the silicon-containing active material may comprise one or more selected from the group consisting of $SiO_x$ (x=0), $SiO_x$ (0<x<2), SiC, and a Si alloy.

The active material of the present disclosure may comprise a silicon-containing active material. The silicon-containing active material may be $SiO_x$, Si/C, or Si. $SiO_x$ may comprise a compound represented by $SiO_x$ (0≤x<2). In the case of $SiO_2$, since it does not react with lithium ions so that lithium cannot be stored, x is preferably within the above range. The silicon-containing active material may be Si/C or Si composed of a composite of Si and C. Further, two or more types of the silicon-containing active material may be mixed and used. The anode active material may further comprise a carbon-containing active material together with the aforementioned silicon-containing active material. The carbon-containing active material may contribute to excellent cycle characteristics or the improvement of battery lifespan performance of the anode or secondary battery of the present disclosure.

In general, silicon-containing active materials are known to have a capacity 10 times or more higher than that of carbon-containing active materials, and accordingly, when the silicon-containing active materials are applied to anodes, it is expected that electrodes with a high level of energy density can be realized even with a thin thickness.

In an embodiment of the present application, the carbon-containing active material may comprise at least one selected from the group consisting of artificial graphite, natural graphite, hard carbon, and soft carbon, preferably at least one selected from the group consisting of artificial graphite and natural graphite.

In an embodiment of the present application, the anode active material may be any substances comprising (1) at least one of artificial graphite, natural graphite, surface-modified graphite, coke, hard carbon, soft carbon, carbon fiber, conductive carbon, and combinations thereof, (2) silicon-containing alloys, (3) a complex compound comprising or consisting of i) at least one of artificial graphite, natural graphite, surface-modified graphite, coke, hard carbon, soft carbon, carbon fiber, conductive carbon, and d combinations thereof, and ii) a metal selected from the group consisting of Al, Ag, Bi, In, Ge, Mg, Pb, Si, Sn, Ti, and combinations thereof, (4) lithium complex metal oxides, (5) lithium-containing nitrides, (6) silicon-graphene, (7) silicon-carbon nanotubes, (8) silicon oxides, (9) silicon, and (10) combinations thereof.

In an embodiment of the present application, there is provided an anode composition in which the silicon-containing active material comprises one or more selected from the group consisting of $SiO_x$ (x=0) and $SiO_x$ (0<x<2), SiC, and a Si alloy is contained in an amount of 70 parts by weight or more based on 100 parts by weight of the silicon-containing active material.

In another embodiment, $SiO_x$ (x=0) may be contained in an amount of 70 parts by weight or more, preferably 80 parts by weight or more, and more preferably 90 parts by weight or more, and may be contained in an amount of 100 parts by weight or less, preferably 99 parts by weight or less, and more preferably 95 parts by weight or less based on 100 parts by weight of the silicon-containing active material.

In an embodiment of the present application, only pure silicon (Si) in the silicon-containing active material may be used as the silicon-containing active material. Using pure silicon (Si) as the silicon-containing active material may mean comprising pure Si particles ($SiO_x$ (x=0)) that are not combined with other particles or elements in the above range when the total amount of the silicon-containing active material is based on 100 parts by weight as described above.

When comparing the silicon-containing active material with the graphite-containing active material that has conventionally been used, it has a significantly high capacity so that attempts to apply it are increasing, but the volume expansion rate is high in the charging and discharging process so that it is limited to the case or the like of using a small amount mixed with the graphite-containing active material and used.

Therefore, in the case of the present disclosure, it is characterized in that, while using the silicon-containing active material as an anode active material to improve capacity performance, a thermally crosslinkable anode binder under specific conditions is used in order to solve problems of maintaining the conductive path due to the volume expansion as described above and maintaining the combination of the conductive material, the binder, and the active material.

Meanwhile, the silicon-containing active material of the present disclosure may have an average particle diameter (D50) of 5 μm to 10 μm, specifically 5.5 μm to 8 μm, and more specifically 6 μm to 7 μm. When the average particle diameter (D50) is included in the above range of 5 μm to 10 μm, the specific surface area of the particles is included in a suitable range so that the viscosity of an anode slurry is formed in an appropriate range. Accordingly, the dispersion of the particles constituting the anode slurry is facilitated.

Further, since the size of the silicon-containing active material has a value greater than or equal to the lower limit value range, the contact area between the silicon-containing active material particles and the conductive materials is excellent due to a composite consisting of the conductive material and the binder in the anode slurry, and the possibility that the conductive network will continue increases so that the capacity retention rate is increased. On the other hand, when the average particle diameter (D50) satisfies the above range, excessively large silicon particles are excluded to form a smooth surface of the anode, thereby enabling a current density non-uniformity phenomenon to be prevented during charging and discharging.

In an embodiment of the present application, the silicon-containing active material generally has a characteristic BET specific surface area. The silicon-containing active material has a BET specific surface area of preferably 0.01 $m^2/g$ to 150.0 $m^2/g$, more preferably 0.1 $m^2/g$ to 100.0 $m^2/g$, particularly preferably 0.2 $m^2/g$ to 80.0 $m^2/g$, and most preferably 0.2 $m^2/g$ to 18.0 $m^2/g$. The BET specific surface area is measured in accordance with DIN 66131 using nitrogen.

In an embodiment of the present application, the silicon-containing active material may exist in, for example, a crystalline or amorphous form, and is preferably not porous. The silicon particles are preferably spherical or fragmented particles. As an alternative but less preferably, the silicon particles may also have a fiber structure or exist in the form of a silicon-containing film or coating.

In an embodiment of the present application, there is provided an anode composition in which the silicon-containing active material is contained in an amount of 60 parts by weight or more based on 100 parts by weight of the anode composition.

In another embodiment, the silicon-containing active material may be contained in an amount of 60 parts by weight or more, preferably 65 parts by weight or more, and more preferably 70 parts by weight or more, and may be contained in an amount of 95 parts by weight or less, preferably 90 parts by weight or less, and more preferably 85 parts by weight or less based on 100 parts by weight of the anode composition.

The anode composition according to the present application does not deteriorate the performance of the anode even when containing the silicon-containing active material in the above range, and has excellent output characteristics in charging and discharging by using specific conductive material and binder capable of holding the volume expansion rate in the charging and discharging process even when a silicon-containing active material having a remarkably high capacity is used in the above range.

In an embodiment of the present application, the silicon-containing active material may have a non-spherical shape, and its circularity is, for example, 0.9 or less, for example, 0.7 to 0.9, for example, 0.8 to 0.9, and for example, 0.85 to 0.9.

In the present application, the circularity is determined by Equation 1-1 below, wherein A is an area, and P is a boundary line.

$$4\pi A/P^2 \qquad \text{[Equation 1-1]}$$

Conventionally, it has been common to use only a graphite-containing compound as an anode active material, but recently, as the demand for high-capacity batteries increases, attempts to mix and use a silicon-containing compound in order to increase capacity are increasing. However, in the case of the silicon-containing compound, there is a limitation in that the volume rapidly expands in the charging/ discharging process, thereby damaging the conductive path formed in the anode active material layer so that the performance of the battery is rather reduced.

Accordingly, in an embodiment of the present application, the anode composition may use a binder having the above characteristics and comprise a specific anode conductive material at the same time.

In an embodiment of the present application, there is provided an anode composition in which the anode conductive material comprises one or more selected from the group consisting of: a dotted conductive material; a planar conductive material; and a linear conductive material.

In an embodiment of the present application, the dotted conductive material is one which may be used to improve conductivity in the anode and may form conductivity without causing chemical change, and means a conductive material having a circular or dotted shape. Specifically, the dotted conductive material may be at least one selected from the group consisting of natural graphite, artificial graphite, carbon black, acetylene black, KETJEN BLACK™, channel black, furnace black, lamp black, thermal black, conductive fiber, fluorocarbon, aluminum powder, nickel powder, zinc oxide, potassium titanate, titanium oxide, and polyphenylene derivatives, and may preferably comprise carbon black in the aspects of realizing high conductivity and obtaining excellent dispersibility.

In an embodiment of the present application, the dotted conductive material may have a BET specific surface area of 40 $m^2/g$ or more and 70 $m^2/g$ or less, preferably 45 $m^2/g$ or more and 65 $m^2/g$ or less, and more preferably 50 $m^2/g$ or more and 60 $m^2/g$ or less.

In an embodiment of the present application, the dotted conductive material may have a particle diameter of 10 nm to 100 nm, preferably 20 nm to 90 nm, and more preferably 40 nm to 60 nm.

In an embodiment of the present application, the anode conductive material may comprise a planar conductive material.

The planar conductive material refers to a conductive material that improves conductivity by increasing surface contact between silicon particles in the anode, and serves to suppress disconnection of a conductive path due to volume expansion at the same time. The planar conductive material may be expressed as a plate-shaped conductive material or a bulk-type conductive material.

In an embodiment of the present application, the planar conductive material may comprise at least one selected from the group consisting of plate-shaped graphite, graphene, graphene oxide, and graphite flakes, and may preferably be plate-shaped graphite.

In an embodiment of the present application, the planar conductive material may have an average particle diameter (D50) of 2 μm to 7 μm, specifically 3 μm to 6 μm, and more specifically 4 μm to 5 μm. When the above range of 2 μm to 7 μm is satisfied, dispersion is easy without causing an excessive increase in the viscosity of the anode slurry based on a sufficient particle size. Therefore, the dispersion effect is excellent when performing dispersion using the same equipment and time.

In an embodiment of the present application, there is provided an anode composition in which the planar conductive material has a D10 of 0.5 μm or more and 1.5 μm or less, a D50 of 4.0 μm or more and 5.0 μm or less, and a D90 of 7.0 μm or more and 15.0 μm or less.

In an embodiment of the present application, the planar conductive material may comprise: a high specific surface area planar conductive material having a high BET specific surface area; or a low specific surface area planar conductive material.

In an embodiment of the present application, the planar conductive material may comprise: a high specific surface area planar conductive material; or a low specific surface area planar conductive material without limitation, but in particular, since the planar conductive material according to the present application may be affected by dispersion to some extent in electrode performance, it may be particularly preferable to use a low specific surface area planar conductive material that does not cause a problem in dispersion.

In an embodiment of the present application, the planar conductive material may have a BET specific surface area of 1 $m^2/g$ or more.

In another embodiment, the planar conductive material may have a BET specific surface area of 1 $m^2/g$ or more and 500 $m^2/g$ or less, preferably 5 $m^2/g$ or more and 300 $m^2/g$ or less, and more preferably 5 $m^2/g$ or more and 250 $m^2/g$ or less.

In another embodiment, the planar conductive material may be a high specific surface area planar conductive material, and may satisfy a BET specific surface area range of 50 $m^2/g$ or more and 500 $m^2/g$ or less, preferably 80 $m^2/g$ or more and 300 $m^2/g$ or less, and more preferably 100 $m^2/g$ or more and 250 $m^2/g$ or less.

In another embodiment, the planar conductive material may be a low specific surface area planar conductive material, and may satisfy a BET specific surface area range of 1 $m^2/g$ or more and 40 $m^2/g$ or less, preferably 5 $m^2/g$ or more and 30 $m^2/g$ or less, and more preferably 5 $m^2/g$ or more and 25 $m^2/g$ or less.

Other conductive materials may comprise linear conductive materials such as carbon nanotubes, etc. The carbon nanotubes may be bundle type carbon nanotubes. The bundle type carbon nanotubes may comprise a plurality of carbon nanotube units. Specifically, herein, the term 'bundle type' refers to, unless otherwise stated, a secondary shape in the form of a bundle or rope, in which a plurality of carbon nanotube units are arranged side by side or entangled so that the axes of the carbon nanotube units in the longitudinal direction are in substantially the same orientation. The carbon nanotube units have a graphite sheet in the form of a cylinder having a nano-size diameter, and have a sp2 bond structure. At this time, the carbon nanotube units may exhibit properties of a conductor or a semiconductor depending on the angle and structure at which the graphite sheet is rolled. The bundle type carbon nanotubes may be uniformly dispersed during the manufacturing of the anode compared to the entangled type carbon nanotubes, and may smoothly form the conductive network in the anode, thereby enabling conductivity of the anode to be improved.

In an embodiment of the present application, there is provided an anode composition in which the anode conductive material comprises a linear conductive material, and the linear conductive material is carbon nanotubes.

In an embodiment of the present application, the carbon nanotubes may be single-walled carbon nanotubes (SWCNTs) and/or multi-walled carbon nanotubes (MWCNTs). When the linear conductive material is SWCNTs, the SWCNTs may have a length of 0.5 μm to 100 μm, preferably 1 μm to 80 μm.

In an embodiment of the present application, there is provided an anode composition in which the anode conductive material is contained in an amount of 5 parts by weight or more and 40 parts by weight or less based on 100 parts by weight of the anode composition.

In another embodiment, the anode conductive material may be contained in an amount of 5 parts by weight or more and 40 parts by weight or less, preferably 5 parts by weight or more and 30 parts by weight or less, and more preferably 5 parts by weight or more and 25 parts by weight or less based on 100 parts by weight of the anode composition.

In an embodiment of the present application, the anode conductive material may comprise a dotted conductive material and a linear conductive material, and a ratio of the dotted conductive material to the linear conductive material may satisfy 1:0.001 to 1:0.05.

In an embodiment of the present application, as the anode conductive material may comprise a dotted conductive material and a linear conductive material, and satisfies each of the compositions and ratios, the lifespan characteristics of an existing lithium secondary battery are not significantly affected, and the number of points enabling charging and discharging increases, thereby obtaining excellent output characteristics at high C-rate.

The anode conductive material according to the present application may have a configuration completely different from the conductive material applied to the cathode. That is, the anode conductive material according to the present application may be one which serves to hold the contact point between silicon-containing active materials having a very large volume expansion of the electrode by charging and discharging, and the cathode conductive material may serve as a buffer of a buffering role when rolled and serve to impart some conductivity, and may have a completely different configuration and role from the anode conductive material of the present disclosure.

In an embodiment of the present application, the thickness change rate of the anode active material layer after curing or drying satisfies Equation 1 below.

$$0\% \leq [(X2-X1)/X1] \times 100(\%) \leq 15\% \quad \text{[Equation 1]}$$

In Equation 1,

X1 is a thickness of the anode active material layer after curing or drying in 0 cycle of the lithium secondary battery anode, and X2 is a thickness of the anode active material layer after curing or drying after 30 cycles of the lithium secondary battery anode.

In an embodiment of the present application, the anode composition may form the anode slurry by comprising a solvent for forming an anode slurry, and an anode may be formed by applying the anode slurry to one or both sides of an anode current collector layer.

At this time, the solid content of the anode slurry may satisfy 10% to 60%.

In an embodiment of the present application, the solvent for forming the anode slurry may be used without limitation as long as it can disperse the anode composition, but specifically distilled water or NMP may be used.

In an embodiment of the present disclosure, a method of mixing the anode slurry is not particularly limited, a ball mill, a sand mill, a pigment disperser, an ultrasonic disperser, a homogenizer, a planetary mixer, a Hobart mixer, etc. are exemplified, and suitably, it is preferably to perform kneading using a homogenizer and/or a planetary mixer.

In an embodiment of the present application, the method of applying the anode slurry to the anode current collector layer is not particularly limited, and conventionally known coating devices such as a comma coater, a gravure coater, a micro gravure coater, a die coater, a bar coater, etc. may be used.

Further, a drying process may be performed after applying the anode slurry, the drying method is also not particularly limited, and the temperature is suitably 60° C. to 200° C., and preferably 100° C. to 180° C. The atmosphere may be dry air or an inert atmosphere. Although the thickness of an electrode (cured coating film) is not particularly limited, it is suitably 5 μm to 300 μm, preferably 10 μm to 250 μm.

In an embodiment of the present application, there is provided a lithium secondary battery anode comprising: an anode current collector layer; and an anode active material layer containing the anode composition according to the present application, formed on one or both surfaces of the anode current collector layer.

In an embodiment of the present application, the anode active material layer may have an additional anode active material layer on a surface opposite to the surface in contact with the anode current collector layer. In this case, the additional anode active material layer may comprise a commonly used anode active material such as carbon-containing or silicon-containing anode active materials.

FIG. 1 is a diagram illustrating a laminated structure of a lithium secondary battery anode according to an embodiment of the present application. Specifically, a lithium secondary battery anode 100 comprising an anode active material layer 20 formed on one surface of an anode current collector layer 10 may be confirmed, and FIG. 1 shows that the anode active material layer is formed on one surface thereof, but it may be formed on both surfaces thereof.

In an embodiment of the present application, the anode current collector layer generally has a thickness of 1 μm to 100 μm. Such an anode current collector layer is not particularly limited as long as it is one which has high conductivity without causing chemical change in the concerned battery, and for example, copper, stainless steel, aluminum, nickel, titanium, calcined carbon, one in which the surface of copper or stainless steel is surface-treated with carbon, nickel, titanium, silver, etc., an aluminum-cadmium alloy, etc. may be used. Further, the anode current collector layer may strengthen the bonding force of the anode active material by forming fine irregularities on its surface, and may be used in various forms such as a film, a sheet, a foil, a net, a porous body, a foam, a nonwoven fabric, etc. Among them, copper foil is preferable as a current collector when using an electrode active material in the anode.

In an embodiment of the present application, there is provided a lithium secondary battery anode in which the anode current collector layer has a thickness of 1 μm or more and 100 μm or less, and the anode active material layer has a thickness of 20 μm or more and 500 μm or less.

However, the thickness may be variously modified depending on the type and use of the anode used, but the present disclosure is not limited thereto.

In an embodiment of the present application, there is provided a lithium secondary battery anode in which the thickness change rate of the anode active material layer satisfies Equation 1 below.

$$0\% \leq [(X2-X1)/X1] \times 100(\%) \leq 15\% \quad \text{[Equation 1]}$$

In Equation 1,

X1 is a thickness of the anode active material layer in 0 cycle of the lithium secondary battery anode, and X2 is a thickness of the anode active material layer after 30 cycles of the lithium secondary battery anode.

The 0 cycle may mean a state in which a lithium secondary battery anode is manufactured and charging/discharging is not yet performed, and specifically may mean a lithium secondary battery anode after manufacturing.

That is, the lithium secondary battery anode according to the present application is characterized in that the thickness change is small by preventing volume expansion of the anode active material even after repeated cycles by using a specific anode binder polymer.

In an embodiment of the present application, there is provided a lithium secondary battery comprising: a cathode; the lithium secondary battery anode according to the present application; a separator provided between the cathode and the anode; and an electrolyte.

Figure 2:
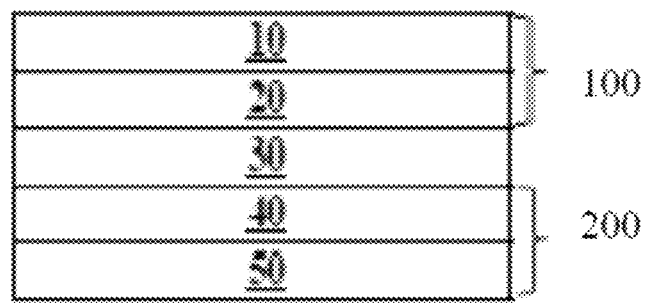
FIG. 2 is a diagram illustrating a laminated structure of a lithium secondary battery according to an embodiment of the present application.

FIG. 2 is a diagram illustrating a laminated structure of a lithium secondary battery according to an embodiment of the present application. Specifically, a lithium secondary battery anode 100 comprising an anode active material layer 20 formed on one surface of an anode current collector layer 10 may be confirmed, a lithium secondary battery cathode 200 comprising a cathode active material layer 40 formed on one surface of a cathode current collector layer 50 may be confirmed, and it shows that the lithium secondary battery anode 100 and the lithium secondary battery cathode 200 are formed in a structure in which they are laminated with a separator 30 being interposed therebetween.

In particular, a secondary battery according to an embodiment of the present specification may comprise the above-described lithium secondary battery anode. Specifically, the secondary battery may comprise an anode, a cathode, a separator interposed between the cathode and the anode, and an electrolyte, and the anode is the same as the above-described anode.

The cathode may comprise a cathode current collector and a cathode active material layer which is formed on the cathode current collector and contains the cathode active material.

In the cathode, the cathode current collector is not particularly limited as long as it has conductivity without causing chemical change in the battery, and for example, stainless steel, aluminum, nickel, titanium, calcined carbon, one in which the surface of aluminum or stainless steel is surface-treated with carbon, nickel, titanium, silver, etc., or the like may be used. Further, the cathode current collector may typically have a thickness of 3 μm to 500 μm, and may increase adhesive strength of the cathode active material by forming fine irregularities on the surface of the current collector. For example, it may be used in various forms such as a film, a sheet, a foil, a net, a porous body, a foam, a nonwoven fabric, etc.

The cathode active material may be a commonly used cathode active material. Specifically, the cathode active material may comprise: a layered compound such as lithium cobalt oxide ($LiCoO_2$), lithium nickel oxide ($LiNiO_2$) or the like, or a compound substituted with one or more transition metals; lithium iron oxides such as $LiFe_3O_4$, etc.; lithium manganese oxides of the formula $Li_{1+c1}Mn_{2-c1}O_4$ ($0 \leq c1 \leq 0.33$), $LiMnO_3$, $LiMn_2O_3$, $LiMnO_2$, etc.; lithium copper oxide ($Li_2CuO_2$); vanadium oxides such as $LiV_3O_8$, $V_2O_5$, $Cu_2V_2O_7$, etc.; Ni site-type lithium nickel oxides represented by the formula $LiNi_{1-c2}M_{c2}O_2$ (where M is at least one selected from the group consisting of Co, Mn, Al, Cu, Fe, Mg, B and Ga, and satisfies $0.01 \leq c2 \leq 0.3$); lithium-manganese composite oxides represented by the formula $LiMn_{2-c3}M_{c3}O_2$ (where, M is at least one selected from the group consisting of Co, Ni, Fe, Cr, Zn and Ta, and satisfies $0.01 \leq c3 \leq 0.1$) or $Li_2Mn_3MO_8$ (where, M is at least one selected from the group consisting of Fe, Co, Ni, Cu, and Zn); $LiMn_2O_4$ in which a part of Li in the formula is substituted with an alkaline earth metal ion; etc., but the present disclosure is not limited thereto. The cathode may be Li-metal.

The cathode active material layer may contain a cathode conductive material and a cathode binder together with the above-described cathode active material.

At this time, the cathode conductive material is one which is used to impart conductivity to the electrode, and in a battery to be configured, a cathode conductive material may be used without any particular limitation as long as it has electronic conductivity without causing chemical change. Specific examples of the cathode conductive material may comprise: graphite such as natural graphite, artificial graphite, or the like; carbon-containing materials such as carbon black, acetylene black, KETJEN BLACK™, channel black, furnace black, lamp black, thermal black, carbon fiber, etc.; metal powders or metal fibers of copper, nickel, aluminum, silver, etc.; conductive whiskers such as zinc oxide, potassium titanate, etc.; conductive metal oxides such as titanium oxide, etc.; conductive polymers such as polyphenylene derivatives, etc.; or the like, and may be used alone or in mixtures of two or more thereof.

Further, the cathode binder serves to improve adhesion between cathode active material particles and adhesive strength between the cathode active material and the cathode current collector. Specific examples of the cathode binder may comprise polyvinylidene fluoride (PVDF), poly(vinylidene fluoride-hexafluoropropylene) (PVDF-co-HFP) copolymer, polyvinyl alcohol, polyacrylonitrile, carboxymethyl cellulose (CMC), starch, hydroxypropyl cellulose, regenerated cellulose, polytetrafluoroethylene, polyethylene, polyvinylpyrrolidone, polypropylene, ethylene propylene diene monomer (EPDM), sulfonated EPDM, styrene butadiene rubber (SBR), fluororubber, various copolymers thereof, or the like, and may be used alone or in mixtures of two or more thereof.

The separator is one which separates the anode and the cathode and provides a moving passage of lithium ions, and as long as it is usually used as a separator in a secondary battery, it can be used without any particular limitation. In particular, it is preferable that the separator has excellent electrolyte moisture-containing capability while having low resistance to ion movement of the electrolyte. Specifically, a porous polymer film, for example, a porous polymer film made of polyolefin-based polymers such as ethylene homopolymer, propylene homopolymer, ethylene/butene copolymer, ethylene/hexene copolymer, ethylene/methacrylate copolymer, etc., or a laminated structure of two or more layers thereof may be used. Further, a usual porous nonwoven fabric, for example, a nonwoven fabric made of high-melting point glass fiber, polyethylene terephthalate fiber, etc. may be used. Further, a coated separator containing a ceramic component or a polymer material may be used in order to secure heat resistance or mechanical strength, and may optionally be used in a single-layer or multilayer structure.

Examples of the electrolyte may comprise, organic liquid electrolytes, inorganic liquid electrolytes, solid polymer electrolytes, gel-type polymer electrolytes, solid inorganic electrolytes, melt-type inorganic electrolytes, etc. which can be used when manufacturing a lithium secondary battery, but the present disclosure is not limited thereto.

Specifically, the electrolyte may comprise a non-aqueous organic solvent and a metal salt.

As the non-aqueous organic solvent, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-Dimethyl-2-imidazolidinone, propylene carbonate derivatives, tetrahydrofuran derivatives, ether, methyl propionate, ethyl propionate, etc. may be used.

In particular, ethylene carbonate and propylene carbonate, which are cyclic carbonates, among the carbonate-containing organic solvents, are high-viscosity organic solvents, and may be preferably used since they have a high dielectric constant and well dissociate lithium salts. If such cyclic carbonates are mixed with low-viscosity, low-dielectric constant linear carbonates such as dimethyl carbonate and diethyl carbonate at an appropriate ratio, and used, an electrolyte having high electrical conductivity may be prepared, and thus they may be used more preferably.

A lithium salt may be used as the metal salt, the lithium salt is a material that is well soluble in the non-aqueous electrolyte, and for example, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as anions of the lithium salt.

In addition to the electrolyte components, for the purpose of improving the lifespan characteristics of the battery, suppressing the decrease in battery capacity, improving the discharge capacity of the battery, etc., the electrolyte may further comprise one or r more additives of, for example, haloalkylene carbonate-containing compounds such as difluoroethylene carbonate and the like, pyridine, triethyl phosphite, triethanolamine, cyclic ether, ethylenediamine, n-glyme, hexaphosphoric acid triamide, nitrobenzene derivatives, sulfur, quinoneimine dye, N-substituted oxazolidinones, N,N'-substituted imidazolidines, ethylene glycol dialkyl ethers, ammonium salts, pyrrole, 2-methoxyethanol, aluminum trichloride, etc.

The lithium secondary battery according to the present disclosure is useful in the fields of portable devices such as mobile phones, notebook computers, digital cameras, and the like, electric vehicles such as hybrid electric vehicles (HEVs) and the like, etc., and in particular, may be preferably used as batteries composing a medium-to-large sized battery module. Accordingly, the present disclosure also provides a medium-to-large sized battery module comprising the lithium secondary battery as described above as a unit battery.

An embodiment of the present disclosure provides a battery module comprising the secondary battery as a unit cell and a battery pack comprising the battery module. Since the battery module and the battery pack comprise the secondary battery having high capacity, high rate performance, and cycle characteristics, they may be used as a power source for a medium-to-large sized device selected from the group consisting of an electric vehicle, a hybrid electric vehicle, a plug-in hybrid electric vehicle, and a system for power storage.

Hereinafter, preferred embodiments are presented to help the understanding of the present disclosure, but the embodiments are merely for exemplifying the present disclosure, and it will be apparent to those skilled in the art that various changes and modifications are possible within the scope and technical spirit of the present disclosure, it goes without saying that such variations and modifications fall within the scope of the appended claims.

PREPARATION EXAMPLE

Preparation of Binder Polymers

Example 1

After injecting 900 g of water, 65 g of acrylamide, 20 g of acrylic acid, 10 g of acrylonitrile, and 5 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Example 2

After injecting 900 g of water, 60 g of acrylamide, 23 g of acrylic acid, 5 g of acrylonitrile, and 12 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Example 3

After injecting 900 g of water, 65 g of acrylamide, 20 g of acrylic acid, 10 g of acrylonitrile, and 5 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Example 4

After injecting 900 g of water, 65 g of acrylamide, 20 g of acrylic acid, 10 g of acrylonitrile, and 5 g of ethylene glycol diacrylate together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Comparative Example 1

After injecting 900 g of water, 50 g of acrylamide, 35 g of acrylic acid, and 15 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Comparative Example 2

After injecting 900 g of water, 50 g of acrylamide, 30 g of acrylic acid, and 20 g of acrylonitrile together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Comparative Example 3

After injecting 900 g of water, 15 g of acrylamide, 20 g of acrylic acid, 60 g of acrylonitrile, and 5 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Comparative Example 4

After injecting 900 g of water, 45 g of acrylamide, 20 g of acrylic acid, 10 g of acrylonitrile, and 25 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Comparative Example 5

After injecting 900 g of water, 45 g of acrylamide, 20 g of acrylic acid, 10 g of acrylonitrile, and 17 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

Comparative Example 6

After injecting 900 g of water, 40 g of acrylamide, 30 g of acrylic acid, 20 g of hydroxyethyl acrylate (HEA), and 5 g of N,N'-methylenebisacrylamide together with 0.5 g of ammonium persulfate as a polymerization initiator into a reactor equipped with a stirrer, a thermometer, a reflux cooling tube, and a nitrogen gas inlet tube, the temperature was raised to 90° C. to perform polymerization for 5 hours, and then the pH of the polymerization reaction product was adjusted to a pH value of 5 with an aqueous NaOH solution to prepare a binder polymer.

The compositions and contents of Examples 1 to 4 and Comparative Examples 1 to 6 prepared as described above are as shown in Table 1.

TABLE 1

|  | A (meth) acrylamide group-containing compound (parts by weight) | An unsaturated organic acid or a salt of the unsaturated organic acid (parts by weight) | Monomer units including $\alpha$, $\beta$-unsaturated nitriles (parts by weight) | A diacrylamide- or diacrylate- containing compound (parts by weight) | Molecular Weight (Mw) |
|---|---|---|---|---|---|
| Example 1 | Acrylamide (65) | Acrylic acid (20) | Acrylonitrile (10) | N,N'-methylene-bisacrylamide (5) | 360,000 |
| Example 2 | Acrylamide (60) | Acrylic acid (23) | Acrylonitrile (5) | N,N'-methylene-bisacrylamide (12) | 640,000 |
| Example 3 | Acrylamide (65) | Acrylic acid (20) | Acrylonitrile (10) | N,N'-methylene-bisacrylamide (5) | 360,000 |
| Example 4 | Acrylamide (65) | Acrylic acid (20) | Acrylonitrile (10) | Ethylene glycol diacrylate (5) | 360,000 |
| Comparative Example 1 | Acrylamide (50) | Acrylic acid (35) | — | N,N'-methylene-bisacrylamide (15) | 790,000 |
| Comparative Example 2 | Acrylamide (50) | Acrylic acid (30) | Acrylonitrile (20) | — | 290,000 |
| Comparative Example 3 | Acrylamide (15) | Acrylic acid (20) | Acrylonitrile (60) | N,N'-methylene-bisacrylamide (5) | 230,000 |
| Comparative Example 4 | Acrylamide (45) | Acrylic acid (20) | Acrylonitrile (10) | N,N'-methylene-bisacrylamide (25) | 1,100,000 |
| Comparative Example 5 | Acrylamide (45) | Acrylic acid (20) | Acrylonitrile (10) | N,N'-methylene-bisacrylamide (17) | 820,000 |

TABLE 1-continued

| | A (meth) acrylamide group-containing compound (parts by weight) | An unsaturated organic acid or a salt of the unsaturated organic acid (parts by weight) | Monomer units including α, β- unsaturated nitriles (parts by weight) | A diacrylamide- or diacrylate- containing compound (parts by weight) | Molecular Weight (Mw) |
|---|---|---|---|---|---|
| Comparative Example 6 | Acrylamide (40) | Acrylic acid (30) | HEA (Hydroxyethyl acrylate) (20) | N, N'-methylene-bisacrylamide (5) | 360,000 |

Preparation of Anode Slurries of Examples 1, 2, and 4 and Comparative Examples 1 to 6

After mixing 1) artificial graphite with d50=15 µm as graphite and 2) $SiO_x$ (d50=1 to 6 µm, $0.9 \leq x \leq 1.5$, for example X=1.05) as silicon at a weight ratio of 7:3 to obtain an anode active material and mixing SUPER PTM black and SWCNTs at a weight ratio of 1:0.005 to obtain a conductive material, the anode active material, the conductive material, and the binder were mixed at a weight ratio of 85:5:10 to prepare an anode composition. At this time, the content of water as a solvent was adjusted in consideration of coating properties, viscosity, and solid content. The viscosity of the obtained slurry composition was adjusted to be 5,000 to 6,000 cps.

At this time, the binders prepared in Table 1 above were respectively used as the binder.

Preparation of Anode Slurry of Example 3

An anode composition was prepared by using pure Si having an average particle diameter (D50) of 3.5 µm as a silicon-containing active material and SUPER PIM black and SWCNTs (the weight ratio of SUPER PIM:SWCNTs=1: 0.005) as a conductive material, thereby mixing the active material, the conductive material, and the binder at a weight ratio of 85:5:10. At this time, the content of water as a solvent was adjusted in consideration of coating properties, viscosity, and solid content. The viscosity of the obtained slurry composition was adjusted to be 5,000 to 6,000 cps.

At this time, the binder of Example 3 prepared in Table 1 above was used as the binder.

Battery Manufacturing and Battery Property Evaluation

After the anode slurries of Examples 1 to 4 and Comparative Examples 1 to 6 above were coated on copper foils having a thickness of 18 µm and dried, active material layers having a thickness of 50 µm were formed on one surface of the copper foils, and punched in a circle with a diameter of 14 @ to manufacture electrodes (anodes) for testing. A metal lithium foil having a thickness of 0.3 mm was used as the cathode, a porous polyethylene sheet having a thickness of 0.1 mm was used as the separator, and a solution obtained by dissolving $LiPF_6$ as the lithium salt at a concentration of about 1 mol/L in a solvent in which ethylene carbonate (EC) and diethyl carbonate (DEC) were mixed at a volume ratio of 1:1 was used as the electrolyte.

The anodes, the cathode, the separator, and the electrolyte were sealed in a stainless steel container to manufacture coin cells for evaluation with a thickness of 2 mm and a diameter of 32 mm. The evaluation results are shown in Table 2 below.

TABLE 2

| | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 | Remarks |
|---|---|---|---|---|---|---|---|---|---|---|---|
| Initial efficiency (%) | 87.4 | 87.1 | 92.5 | 87.9 | 87.3 | 86.1 | 76.8 | 77.4 | 79.1 | 85 | Discharge capacity/charge capacity |
| Capacity retention rate (%) | 87 | 88 | 82 | 85 | 68 | 71 | 61 | 59 | 69 | 69 | 30 cycles |
| Thickness increase rate (%) | 13 | 10 | 14 | 14 | 27 | 23 | 32 | 31 | 24 | 20 | 30 cycles |

Initial efficiency (%): The coin cells were charged with a constant current of 0.05 C until the voltage became 0.01 V and discharged with a constant current of 0.05 C until the voltage became 1.5V so that discharge capacities and initial efficiencies were respectively obtained, and expressed as values of (discharge capacity/charge capacity)×100(%).

Capacity retention rate (%): The coin cells were charged with a constant current of 0.05 C until the voltage became 0.01 V and discharged with a constant current of 0.05 C until the voltage became 1.5V, and then cycle characteristics were performed in the same voltage range as above with a constant current of 0.2 C to conduct a capacity retention test, thereby calculating the capacity retention rates based on 30 cycles.

Thickness increase rate (%): The thickness values (X1) of the anode active material layers in the manufactured coin cells were measured, and the coin cells were charged with a constant current of 0.05 C until the voltage became 0.01 V and discharged with a constant current of 0.05 C until the voltage became 1.5V, and then cycle characteristics were performed in the same voltage range as above with a constant current of 0.2 C, thereby measuring the thickness values (X2) of the anode active material layers in the coin cells after 30 cycles.

Examples 1 to 4 above correspond to cases of using the anode binder according to the present disclosure. Therefore, it could be confirmed that, even when an anode active material (especially, a silicon-containing active material) having a large volume expansion due to charging/discharging was used, volume expansion and contraction could be suppressed, thickness change due to electrode swelling could be minimized, and accordingly, the lifespan performance of the lithium secondary battery was excellent.

Specifically, it could be confirmed that, in order to partially crosslink the linear polymer, a specific amount of a diacrylamide- or diacrylate-containing compound was contained to form a partially crosslinked structure so that, due to the partially crosslinked structure of the binder itself, the thickness change of the electrode during charging and discharging was small and the capacity retention rate during the lifespan evaluation was improved.

In particular, in the case of Example 3 above, an anode in which 100% of Si was applied was used as an anode active material. In the case of pure Si, it was difficult to generally apply this since the volume expansion was severe according to charging and discharging. However, it could be confirmed that, as the specific binder according to the present disclosure was contained, the initial efficiency was superior to those of other Examples 1, 2 and 4 as described above. Although the thickness is also increased using pure Si particles due to material properties compared to other Examples 1 and 2, the thickness increase rate is within the range of 0% to 15% by applying the binder of the present disclosure, and in this case, it corresponds to a level that does not cause a problem in driving the anode. That is, it could be confirmed that the anode of Example 3 was capable of maximizing the capacity characteristics and easily holding the volume expansion at the same time.

Comparative Examples 1 and 2 are cases in which monomer units including $\alpha,\beta$-unsaturated nitriles; or a diacrylamide- or diacrylate-containing compound are not contained. In these cases, it can be confirmed that the initial efficiencies are similar to those of the Examples, but the binders do not hold the volume expansion of the silicon-containing active material and thus do not serve as a binder.

Comparative Examples 3 to 5 above are cases in which four compositions are contained in the anode binder polymer as in the present disclosure, but the content portions thereof are different. In these cases, it could also be confirmed as in Comparative Examples 1 and 2 that the volume expansion of the silicon-containing active material was not held, and the conductive path was damaged, and thus the performance of the battery was lowered.

It is observed that Comparative Example 6 includes monomer units including hydroxyalkyl(meth)acrylate. In use of monomer units including hydroxyalkyl(meth)acrylate, it can be confirmed that the initial efficiencies are similar to those of the Examples, but the binders do not hold the volume expansion of the silicon-containing active material and thus do not sufficiently serve as a binder.

REFERENCE NUMERALS

10: Anode Current Collector Layer
20: Anode Active Material Layer
30: Separator
40: Cathode Active Material Layer
50: Cathode Current Collector Layer
100: Lithium Secondary Battery Anode
200: Lithium Secondary Battery Cathode

What is claimed is:

1. An anode composition, comprising:
an anode binder polymer;
an anode active material; and
an anode conductive material,
wherein the anode binder polymer comprises:
  a (meth) acrylamide group-containing compound;
  an unsaturated organic acid or a salt of the unsaturated organic acid;
  monomer units including $\alpha,\beta$-unsaturated nitriles; and
  a diacrylamide- or diacrylate-containing compound,
wherein the anode binder polymer has a weight average molecular weight of 360,000 g/mol or more and 640,000 g/mol or less,
wherein the anode active material comprises a silicon-containing active material,
wherein the silicon-containing active material comprises at least one selected from the group consisting of $SiO_x$, wherein x=0, and $SiO_x$, wherein 0<x<2, SiC, and a Si alloy, which is present in an amount of 70 parts by weight or more based on 100 parts by weight of the silicon-containing active material,
wherein the anode composition comprises: 1 part by weight or more and 30 parts by weight or less of the monomer units including $\alpha,\beta$-unsaturated nitriles, and 5 parts by weight or more and 12 parts by weight or less of the diacrylamide- or diacrylate-containing compound based on 100 parts by weight of the anode binder polymer,
wherein the (meth)acrylamide group-containing compound is acrylamide;
wherein the unsaturated organic acid or a salt of the unsaturated organic acid is acrylic acid;
wherein the monomer units including $\alpha,\beta$-unsaturated nitriles is acrylonitrile; and
wherein the diacrylamide- or diacrylate-containing compound is N,N'-methylenebisacrylamide.

2. The anode composition of claim 1, wherein a molar ratio of the (meth)acrylamide group-containing compound to the unsaturated organic acid or the salt of the unsaturated organic acid is 1:0.1 to 1:0.6.

3. The anode composition of claim 1, wherein the anode binder polymer is present in an amount of 1 part by weight or more and 20 parts by weight or less based on 100 parts by weight of the anode composition.

4. The anode composition of claim 1, wherein the anode conductive material comprises at least one selected from the group consisting of a dotted conductive material, a planar conductive material, and a linear conductive material.

5. The anode composition of claim 1, wherein the anode conductive material comprises a dotted conductive material and a linear conductive material, and a ratio of the dotted conductive material to the linear conductive material ranges from 1:0.001 to 1:0.05.

6. The anode composition of claim 1, wherein the anode active material comprises the silicon-containing active material, which comprises the $SiO_x$, wherein 0<x<2.

7. The anode composition of claim 1, wherein the anode active material is present in an amount of 60 parts by weight or more based on 100 parts by weight of the anode composition.

8. The anode composition of claim 1, wherein the silicon-containing active material, which comprises the SiC or the Si alloy.

9. The anode composition of claim 1, wherein the anode active material further comprises a carbon-containing active material comprising artificial graphite, natural graphite, surface-modified graphite, coke, hard carbon, soft carbon, carbon fiber, conductive carbon, or a combination thereof.

10. The anode composition of claim 1, wherein the anode active material comprises both of the silicon-containing active material and a carbon-containing active material.

11. The anode composition of claim 10, wherein the silicon-containing active material has an average particle diameter (D50) of 5 μm to 10 μm.

12. A lithium secondary battery anode comprising:
an anode current collector; and
an anode active material layer comprising the anode composition according to claim 1 on at least one surface of the anode current collector.

13. The lithium secondary battery anode of claim 12, wherein the anode current collector has a thickness of 1 μm or more and 100 μm or less, and the anode active material layer has a thickness of 20 μm or more and 500 μm or less.

14. The lithium secondary battery anode of claim 12, wherein a thickness change rate of the anode active material layer satisfies the following Equation 1:

$$0\% \leq [(X2-X1)/X1] \times 100(\%) \leq 15\% \quad [\text{Equation 1}]$$

in Equation 1,
X1 is a thickness of the anode active material layer at 0 cycle of the lithium secondary battery anode, and
X2 is a thickness of the anode active material layer after 30 cycles of the lithium secondary battery anode.

15. A lithium secondary battery comprising:
a cathode;
the lithium secondary battery anode according to claim 12;
a separator between the cathode and the anode; and
an electrolyte.

* * * * *